United States Patent
Arnold et al.

(10) Patent No.: US 10,541,558 B2
(45) Date of Patent: *Jan. 21, 2020

(54) WIRELESS POWER TRANSFER VIA ELECTRODYNAMIC COUPLING

(71) Applicant: University of Florida Research Foundation, Incorporated, Gainesville, FL (US)

(72) Inventors: David Patrick Arnold, Gainesville, FL (US); Shuo Cheng, Gainesville, FL (US); Vinod Reddy Challa, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 290 days.

This patent is subject to a terminal disclaimer.

(21) Appl. No.: 15/432,505

(22) Filed: Feb. 14, 2017

(65) Prior Publication Data

US 2017/0155287 A1  Jun. 1, 2017

Related U.S. Application Data

(63) Continuation of application No. 13/989,293, filed as application No. PCT/US2011/046748 on Aug. 5, 2011, now Pat. No. 9,866,066.

(Continued)

(51) Int. Cl.
*H02J 50/10* (2016.01)
*H02J 50/00* (2016.01)
(Continued)

(52) U.S. Cl.
CPC ............. *H02J 50/10* (2016.02); *H02J 17/00* (2013.01); *H02J 50/00* (2016.02); *H02J 50/12* (2016.02);
(Continued)

(58) Field of Classification Search
CPC .. H02J 50/10; H02J 50/12; H02J 50/50; H02J 50/00; H02J 17/00; H02J 5/005; H02K 99/10; H02K 35/02; H02N 1/08
See application file for complete search history.

(56) References Cited

U.S. PATENT DOCUMENTS

| | | | | |
|---|---|---|---|---|
| 1,681,564 A | * | 8/1928 | Wright | H04L 5/06 370/302 |
| 4,204,490 A | * | 5/1980 | Ohki | F02P 9/005 123/149 A |

(Continued)

FOREIGN PATENT DOCUMENTS

| | | |
|---|---|---|
| EP | 1970993 A1 | 9/2008 |
| JP | 7170667 A | 7/1995 |

(Continued)

OTHER PUBLICATIONS

C.B. Williams, R.B. Yates, "Analysis of a micro-electric generator for microsystems," Sensors and Actuators, A 52, pp. 8-11 (Year: 1996).*

(Continued)

*Primary Examiner* — Pinping Sun
(74) *Attorney, Agent, or Firm* — Thomas Horstemeyer, LLP

(57) ABSTRACT

Wireless power transmission (WPT) systems are provided. According to an embodiment, the WPT system uses one or more power transmitting coils and a receiver for electromagnetically coupled wireless power transfer. The electrodynamic receiver can be in the form of an electrodynamic transducer where a magnet is allowed to oscillate near a receiving coil to induce a voltage in the receiving coil, a piezoelectric transducer where the magnet causes a vibrating structure with a piezoelectric layer to move, an electrostatic transducer where movement of the magnet causes a capacitor plate to move, or a combination thereof. An alternating (Continued)

magnetic field from the transmitting coil(s) excites the magnet in the receiver into mechanical resonance. The vibrating magnet then functions similar to an energy harvester to induce voltage/current on an internal coil, piezoelectric material, or variable capacitor. Embodiments utilize magnetic coupling and electromechanical resonance for safe, spatially distributed, low-frequency power delivery to portable devices.

17 Claims, 12 Drawing Sheets

Related U.S. Application Data

(60) Provisional application No. 61/417,059, filed on Nov. 24, 2010.

(51) Int. Cl.
*H02J 50/50* (2016.01)
*H02K 99/00* (2014.01)
*H02K 35/02* (2006.01)
*H02N 1/08* (2006.01)
*H02J 17/00* (2006.01)
*H02J 50/12* (2016.01)

(52) U.S. Cl.
CPC .............. *H02J 50/50* (2016.02); *H02K 35/02* (2013.01); *H02K 99/10* (2016.11); *H02N 1/08* (2013.01)

(56) References Cited

U.S. PATENT DOCUMENTS

| | | | | |
|---|---|---|---|---|
| 4,312,025 A * | 1/1982 | Boyer | ............ | H01G 5/18 361/289 |
| 4,675,658 A | 6/1987 | Anderson | | |
| 5,600,225 A | 2/1997 | Goto | | |
| 5,998,995 A | 12/1999 | Oslander | | |
| 6,238,899 B1 | 5/2001 | Blackman | | |
| 6,331,744 B1 * | 12/2001 | Chen | ............ | A47J 36/26 310/171 |
| 7,142,075 B1 | 11/2006 | Roesler | | |
| 7,256,532 B2 * | 8/2007 | Viehland | ............ | H01L 41/00 310/358 |
| 8,106,539 B2 * | 1/2012 | Schatz | ............ | H02J 50/80 307/104 |
| 8,378,523 B2 * | 2/2013 | Cook | ............ | H01Q 1/248 307/104 |
| 8,624,700 B2 * | 1/2014 | Arnold | ............ | H01F 29/10 336/200 |
| 8,648,721 B2 | 2/2014 | Copeland | | |
| 2005/0093302 A1 | 5/2005 | Miyazaki | | |
| 2007/0182367 A1 | 8/2007 | Partovi | | |
| 2008/0042816 A1 * | 2/2008 | Pennisi | ............ | G01P 1/07 340/441 |
| 2008/0054638 A1 | 3/2008 | Greene | | |
| 2008/0169805 A1 * | 7/2008 | Cho | ............ | G01R 33/1223 324/201 |
| 2008/0187013 A1 | 8/2008 | Guenter | | |
| 2009/0072627 A1 * | 3/2009 | Cook | ............ | H02J 5/005 307/104 |
| 2009/0072629 A1 | 3/2009 | Cook | | |
| 2009/0127937 A1 | 5/2009 | Widmer et al. | | |
| 2009/0167449 A1 | 7/2009 | Cook et al. | | |
| 2009/0171404 A1 * | 7/2009 | Irani | ............ | A61N 1/056 607/2 |
| 2009/0243397 A1 | 10/2009 | Cook et al. | | |
| 2010/0141042 A1 | 6/2010 | Kesler et al. | | |
| 2010/0164297 A1 | 7/2010 | Kurs et al. | | |
| 2010/0171368 A1 | 7/2010 | Schatz et al. | | |
| 2010/0201315 A1 | 8/2010 | Oshimi et al. | | |
| 2010/0231340 A1 | 9/2010 | Fiorello et al. | | |
| 2010/0237709 A1 | 9/2010 | Hall et al. | | |
| 2010/0237824 A1 | 9/2010 | Sip | | |
| 2010/0244583 A1 | 9/2010 | Shimokawa | | |
| 2010/0259108 A1 | 10/2010 | Giler et al. | | |
| 2011/0304220 A1 | 12/2011 | Whitehead | | |
| 2012/0020117 A1 | 1/2012 | Arnold | | |
| 2012/0086018 A1 | 4/2012 | Yao | | |
| 2012/0187903 A1 * | 7/2012 | Tabata | ............ | H02J 7/025 320/108 |
| 2012/0187904 A1 * | 7/2012 | Tabata | ............ | H02J 5/005 320/108 |
| 2013/0288621 A1 * | 10/2013 | Pennisi | ............ | G08C 17/00 455/127.1 |

FOREIGN PATENT DOCUMENTS

| | | | | |
|---|---|---|---|---|
| JP | 2010098861 | | 4/2010 | |
| WO | 2008/011466 A1 | | 1/2008 | |
| WO | 2009/039293 A1 | | 3/2009 | |
| WO | WO-2009039293 A1 * | | 3/2009 | ............ H02K 7/1892 |
| WO | WO-2010096917 A1 * | | 9/2010 | ............ H01F 21/08 |

OTHER PUBLICATIONS

Leland, E., et al. "A Self-Powered Mems Sensor for AC Electric Current," PowerMEMS 2009, Washington DC, Dec. 1-4, 2009, pp. 53-56.
Paprotny, I. et al., "Optimization of a Die-Sized (10×10×4 MM3) MEMS AC Energy Scavenger for Residential and Commercial Electricity End-Use Monitoring," PowerMEMS 2009, Washington DC, Dec. 1-4, 2009, pp. 241-244.
Paprotny, I., et al. "Self-Powered MEMS Sensors for Measuring Electrical Quantities in Residential, Commercial, Distribution and Transmission Power Systems," IAB 2010, Mar. 12, 2010.
Wang, K-C., et al. "Study of Applying Contactless Power Transmission System to Battery Charge," INternational Conference on Power Electronics and Drive Systems (PEDS), 2009, Nov. 2-5, 2009, pp. 257-262.
Li, M. "Design of Wireless Energy-Transferring Charger" Journal of Huanggang Polytechnic, Feb. 2009. (English Abstract Only).
Roundy, et al., "A piezoelectric vibration based generator for wireless electronics" Smart materials and structure, 13 (2004), pp. 1131-1142.
Challa, et al., "A vibration energy havesting device with bidirectional resonance frequency tunability," Jan. 8, 2008, IPO publishing, smart mater struct. 17 (2008)015035, pp. 1-10.
Harb, "Energy harvesting: state of the art," Jul. 20, 2010, renewable energy, 36(2011), pp. 2641-2654.

\* cited by examiner

WIRELESS POWER TRANSFER VIA ELECTRODYNAMIC COUPLING

CROSS-REFERENCE TO RELATED APPLICATION

The present application is a continuation application of U.S. application Ser. No. 13/989,293, filed May 23, 2013, which is a 371 U.S. national stage application of International Application No. PCT/US2011/046748, filed Aug. 5, 2011, which claims the benefit of U.S. Provisional Application Ser. No. 61/417,059 filed Nov. 24, 2010, which are hereby incorporated by reference in their entirety, including all figures, tables and drawings.

BACKGROUND OF THE INVENTION

Battery-powered systems are becoming increasingly ubiquitous for industrial, personal, and medical use. Because of the finite energy storage available to battery-powered systems, battery replacement and/or charging must be performed periodically over the lifetime of these systems. These maintenance procedures typically require physical contact or wire connections with the devices, which may be inconvenient, difficult, or costly in applications such as harsh-environment sensor networks or implanted medical devices. Even where batteries can be easily recharged, the ever-growing hunger for portable power has presented an un-ignorable technical challenge. With the proliferation of wireless devices, the power cable acts as a virtual umbilical cord and presents a cumbersome hindrance to a completely unfettered wireless world.

Recently, numerous solutions have been proposed to address this power problem. Two promising options are energy harvesting and wireless power transmission (WPT). Energy-harvesting systems convert ambient energy sources, such as light, vibration, thermal, and acoustic sources, into electrical energy. The complete freedom from external electric power sources enables systems to be applied in a variety of environments. However, because of the typically low power densities of the ambient energy sources and limited energy conversion efficiencies, current energy-harvesting systems have been targeting very low-power applications (1 µW-1 mW). Higher output powers are possible by using volumetrically larger energy harvesters, but this becomes size-prohibitive for compact applications. Another disadvantage of energy harvesting devices is that they are at the mercy of the environment. Intermittency and variability of the environmental energy source result in overdesign of the energy harvester to ensure adequate power generation and require more complicated power electronics to regulate voltage and power flow, problems that are exacerbated in unpredictable environments.

In contrast to energy harvesting systems, WPT systems actively transfer power from a source to a receiver, providing deterministic control over the power delivery. WPT relies on power transmission using electromagnetic fields, without requiring physical connections (conductive wire, optic fiber, waveguide, etc.) between the power source and receiver.

As used herein WPT refers to transmission over moderate distances, as opposed to "contactless power transfer," which generally refers to short-range power delivery across an electrically isolative barrier using transformer cores on either side of the barrier. The most common WPT approaches rely on either radiative electromagnetic waves or near-field capacitive/inductive coupling.

In the radiative electromagnetic wave approach, a focused beam of electromagnetic energy is generated by the source and pointed toward the receiver. For example, a laser can be used as the source, and a photovoltaic material on the receiver can be used to convert the optical energy to electrical energy. One advantage of this "directed energy" approach is that the power can be concentrated in the focused beam, therefore enabling a large amount of power to be transferred in a small area. However, this necessitates knowledge of receiver location and methods for active tracking if the receiver moves in space. Additionally, due the absorptive nature of this radiated energy, the transmission path must be clear of objects, which may be difficult to realize in many applications.

In the near-field capacitive/inductive coupling approach, capacitively or inductively coupled WPT systems transfer power via spatially distributed, time-varying (yet quasi-static) electric or magnetic fields.

Recent research has focused on near-field power transfer using inductively coupled coils. The operating principle of these systems is similar to air-core transformers. FIG. 1 illustrates a basic configuration of the inductively coupled WPT system, which uses two coils 11 and 12 separated by a distance g and functions as a weakly coupled, air-core transformer. Due to the weak mutual inductance between the air-coupled coils, the operating frequency of such systems is usually in the RF range (1-100 MHz) to achieve reasonable efficiency.

One advantage of the capacitive/inductive coupling approach over the radiative electromagnetic wave approach is that power can be distributed over a large volume of space, and arrays of receivers are possible.

Accordingly, the range and transmittance of magnetic fields makes inductively coupled WPT attractive for many applications.

While the inductively coupled WPT systems have the benefit of using magnetic fields to pass through many materials and objects (as compared to electric fields), there are practical limits to both power levels and efficiency, especially for powering wireless sensors.

According to Faraday's law, $$V(t) = -N \frac{d\Phi}{dt}, \quad (1)$$

the voltage V induced on the receiving coil is proportional to the number of coil turns N and the time-rate-change of magnetic flux $\Phi$ through the coil. For a time-varying magnetic field B(t) in a stationary coil, Equation (1) can be rewritten as $$V(t) = -N \int_S \frac{\partial B}{\partial t} \cdot ds. \quad (2)$$

For sinusoidal excitation, the voltage is proportional to (angular) frequency, peak magnetic flux density, and the coil area. Because the induced power is proportional to the square of the voltage, maximizing the product of the frequency, peak magnetic flux density, and the coil area will increase the transmitted power.

However, there are strict safety limits on magnetic and electric fields for RF power transmission that greatly restrict the range, efficiency, and thus application of these systems.

As explained above, since the power is proportional to the square of the voltage, in order to deliver a certain amount of power, either the frequency or the flux density in the receiving coil (the area of the receiving coil is usually predetermined) needs to be sufficiently high, which may not be achievable without violating the safety limits.

Specifically, if small coils are used (small area, low number of turns), then the frequency and/or magnetic flux density must be increased in order to increase the power transfer. However, the time-varying electromagnetic fields that permeate the power transmission media can cause safety hazards.

For example, in order to transfer Watts of power in an inductively coupled WPT system, the magnetic flux density that permeates the media may be on the order of $10^{-4}$ T. Such strong flux density is only safe when the operating frequency is lower than 100 kHz. For even lower frequencies, the flux density safety limit is higher. For example, flux density up to $10^{-3}$ T can be tolerated when the frequency is lower than 760 Hz, and up to 0.4 T of static flux density can be tolerated by general public.

The Institute of Electrical and Electronics Engineers (IEEE) and the International Commission on Non-Ionizing Radiation Protection (ICNIRP) place strict limits on electromagnetic field intensities. For example, ICNIRP data shows that up to 400 mT of static magnetic flux density is safe for the general public to avoid interference with magnetic strips in credit cards or devices such as pace makers. For alternating current (ac) fields, IEEE C95.6 permits up to 1 mT for frequencies below 760 Hz. For frequencies from 760 Hz-100 kHz, IEEE C95.1 restricts the field to 0.1 mT. Accordingly, safety limits and coil size put an upper limit on the power level that can be transmitted via inductively coupled WPT.

Even if the magnetic field densities are kept in a safe regime, the low mutual inductance between the coils generally requires the operating frequency to be high (usually >100 kHz), so that the mutual reactance is sufficiently larger than the coil and radiation resistances. These high frequencies create additional system limitations. First, the high-frequency electromagnetic fields may induce large eddy currents in any conductive materials that are present in the power transmission path. The power loss (and Joule heating) due to these eddy currents is proportional to the square of the frequency. In many home, medical, or industrial applications, power transmission through the metal cases may be required, so eddy current losses will reduce the overall efficiency and may cause unwanted heating problems.

Power transmission efficiency is another consideration. High efficiencies can be achieved for short-distance power transmissions where the resonators are strongly coupled, but the efficiency plummets if the separation distance g is large relative to the size $d_1$ and $d_2$ of the coils 11 and 12 (see FIG. 1). For typical resonators having a Q of 100, the efficiency drops below 50% when the distance is approximately $g \approx \sqrt{d_1 d_2}$; with a Q of 1000, this distance can be extended by a factor of three. This establishes a fundamental design tradeoff between transmit distance and coil size; longer transmission distances require larger diameter coils or higher quality factors.

Another issue is robustness. To maximize the efficiency and range, the resonators are usually designed to have high quality factors. As a result, the system performance is very sensitive to the resonator parameters, since the transmitter and receiver must be precisely matched. From the manufacturing aspect, the required tolerances in the coil inductance and capacitance are very tight, which can be costly or even impossible to realize. Even if initially matched or manually tuned, uncontrollable parasitic capacitances/inductances, for example due to temperature, humidity, and/or coil positions, can lead to mismatches in resonant frequency. In addition, these uncontrollable parasitic capacitances/inductances can drastically reduce the transmit power and efficiency. To overcome this eventual mismatch, a complicated active tuner/controller is used to compensate for parameter variation. The design of the tuner/controller increases the cost and complexity of the system.

Furthermore, tuning the resonant frequencies of the transmitter and the receiver makes it difficult to power an array of receivers with one single transmitter. Since the high efficiency of the inductive WPT system relies on matching the resonant frequencies of the transmitter and the receivers, all of the receivers need to resonate at the same frequency. This causes interference or cross talk between receivers. That is, the current flow in one receiver may induce significant voltage in other receivers. To mitigate this interference, additional complicated power flow control circuits may be required.

Because of the various limitations on inductive WPT, application of inductive WPT has been limited to short-range, highly specific applications such as electric vehicles and consumer electronic charging pads. While clever electronic control circuits have overcome some of the tuning challenges, there continue to be challenges in widespread implementation of inductive WPT because of the range, power, and efficiency limits of the existing inductive WPT structures.

BRIEF SUMMARY

Wireless power transfer devices and methods utilizing an electrodynamically coupled approach to WPT are provided.

In accordance with certain embodiments of the invention, an electrodynamically coupled WPT system is provided that actively delivers power from a transmitter generating a low frequency (e.g., less than 10 kHz), time-varying magnetic field to a receiver having an electromechanical conversion mechanism. The electromechanical conversion mechanism can involve a permanent magnet and a receiver coil (electrodynamic conversion), a piezoelectric component (piezoelectric conversion), a variable or plate capacitor (electrostatic conversion), or a combination of conversion techniques. The influence of the transmitter on the permanent magnet provides the WPT system its initial electrodynamic aspect.

According to one embodiment of the invention, a wireless power transfer system utilizing a transmitter and receiver includes a permanent magnet positioned to oscillate in the vicinity of a receiving coil of the receiver, providing a large flux density in the coil.

The receiving coil and the magnet can be configured in the same package, forming an electrodynamic transducer. The transmitting coil of the transmitter is outside the package. The transmitting coil carries an alternating current and can be connected to a power source. The field generated by the transmitting coil activates the motion of the magnet through magnetic force.

Even using fairly weak magnetic fields, significant mechanical oscillations can be induced when the receiver magnet is excited near its mechanical resonance (assuming an underdamped mechanical system). The vibrating magnet presents a large time-varying flux density in the receiving coil, much stronger than the field produced by the transmitting coil.

Power is generated on the receiving coil in a manner similar to an electrodynamic vibrational energy harvester, except the system excitation is provided by the magnetic force rather than an external vibration. In particular, according to embodiments of the subject WPT system, the magnet excitation is provided by an external magnetic field rather than a mechanical vibration.

According to another embodiment, a wireless power transfer system utilizing a transmitter and receiver includes a permanent magnet positioned to oscillate at an end of a vibrating structure (e.g., cantilever, membrane, fixed-fixed beam) formed of piezoelectric material. In such an embodiment, the magnet and piezoelectric vibrating structure can be configured in the same package, forming a piezoelectric transducer. The transmitting coil of the transmitter is outside the package. The transmitting coil carries an alternating current and can be connected to a power source. The field generated by the transmitting coil activates the motion of the magnet through magnetic force. Power is generated in the piezoelectric vibrating structure in a manner similar to a piezoelectric vibrational energy harvester, except the system excitation is provided by the magnetic force or torque of the magnet rather than an external vibration.

According to yet another embodiment, a wireless power transfer system utilizing a transmitter and receiver includes a permanent magnet positioned to oscillate at an end of a vibrating structure connected to a plate of a variable capacitor, enabling electrostatic energy conversion. Here, power is generated by the variable capacitor in a manner similar to an electrostatic vibrational energy harvester, except the system excitation is provided by the magnetic force or torque of the magnet rather than an external kinetic vibration.

Unlike inductively coupled WPT systems, where strong electric and magnetic fields permeate the transmitting media, the strong magnetic field in the electrodynamically coupled system (from the magnet) is limited to the receiving region (near the magnet). This will greatly reduce the exposure of human body to strong magnetic fields.

Due to the high magnetic field within the receiving coil (near the magnet) for embodiments utilizing a receiving coil for the electromechanical conversion, not only can the operating frequency be reduced, but also the receiving coil size. Accordingly, certain embodiments of the invention can be operated at low-frequency operation and using a much smaller receiver as compared to inductively coupled WPT systems.

BRIEF DESCRIPTION OF THE DRAWINGS

FIG. 11A shows a photograph of the whole system setup and FIG. 11B shows a photograph of the electrodynamic receiver of the experimental setup.

FIG. 16A shows a photograph of the system setup and FIG. 16B shows a photograph of the electrodynamic receiver of the prototype.

DETAILED DISCLOSURE

Embodiments of the invention provide wireless power transmission (WPT) systems that actively deliver power from a source to a receiver, providing deterministic control over the power transfer. Embodiments of the invention provide wireless power transfer devices and methods utilizing an electrodynamically coupled approach to WPT. In accordance with certain embodiments of the invention, an electrodynamically coupled WPT system is provided in which a current-carrying coil (transmitter) generates a low-frequency, time-varying magnetic field that induces a sinusoidal mechanical forcing function on a permanent magnet residing on a receiver. The resulting magnet motion (e.g., vibration) can be converted into electrical power via electromechanical conversion. The electromechanical conversion can be electrodynamic, piezoelectric, electrostatic, or a combination of one or more conversion methods.

The receiver is similar to a vibrational energy harvester, where, in certain embodiments of the invention, the mechanical excitation is a result of an electrodynamic coupling between a power transmitter and a magnet on the receiver. For example, mechanical energy is induced by the power transmitter in a receiver having a cantilever beam with a magnetic tip mass. The power transmitter includes at least one transmitter coil applied with an alternating current. For peak power outputs, the frequency of the alternating current in the transmitter coil(s) is matched with natural frequency of the receiver device to induce mechanical resonance.

Figure 1:
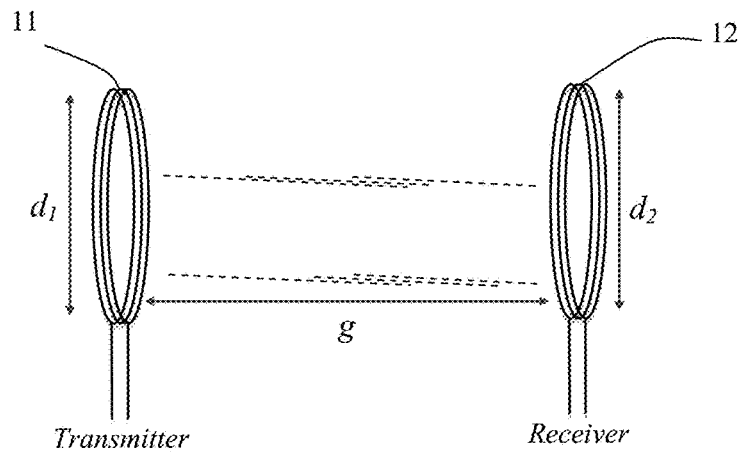
FIG. 1 shows a schematic diagram of a conventional inductively coupled WPT system.
Figure 2:
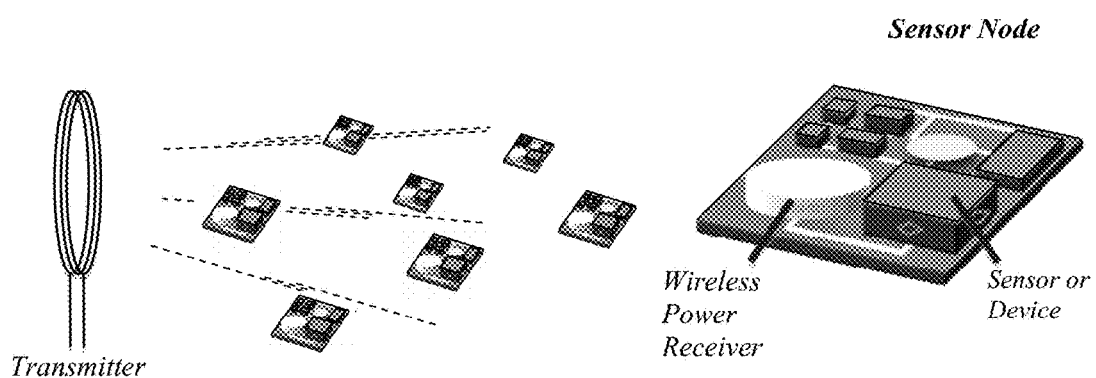
FIG. 2 shows a schematic diagram of an electrodynamically coupled WPT system for sensor arrays in accordance with an embodiment of the invention.

In one embodiment, the subject WPT system can be implemented for wireless sensor nodes (see FIG. 2). In a specific embodiment, each wireless sensor node can include a wireless power receiver having a receiving transducer in accordance with an embodiment of the subject system. The receivers in the sensor array can be tuned to resonate at the same or different frequencies, and the transmitter coil can broadcast power in multiple frequency bands. Not only can power be delivered to multiple receivers, the system can intelligently and selectively deliver power to specific receivers.

Figure 3A:
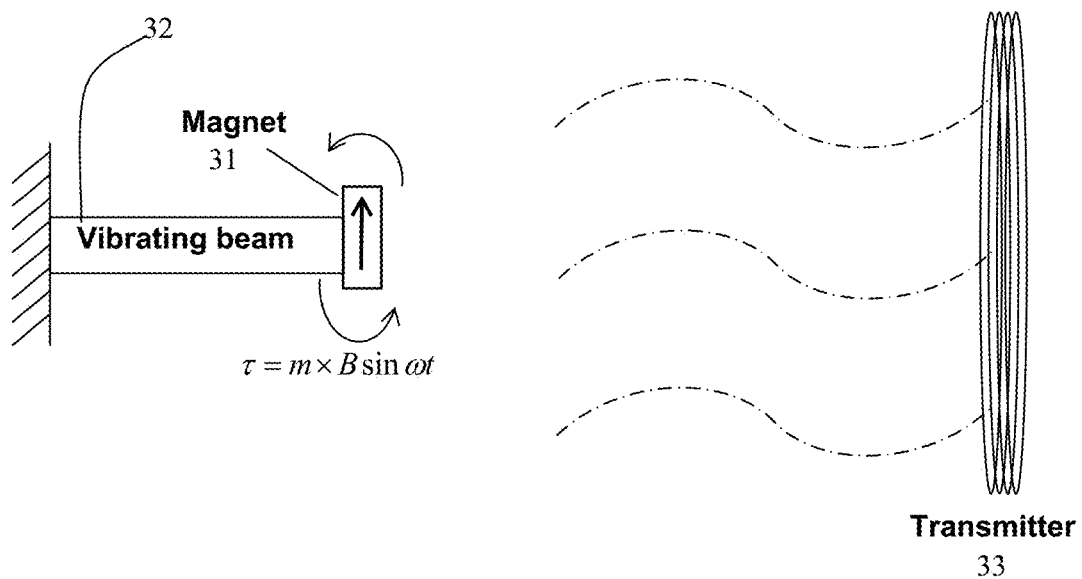
FIGS. 3A and 3B illustrate torque mode and force mode receiver configurations in accordance with certain embodiments of the invention.
Figure 3B:
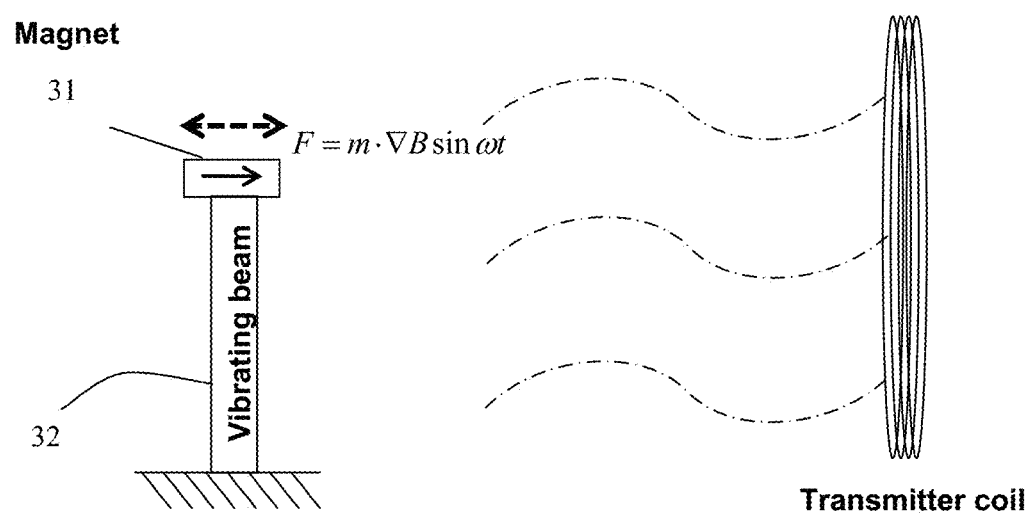

FIGS. 3A and 3B illustrate torque mode and force mode receiver configurations for certain embodiments having a magnet 31 attached at an end of a vibrating structure 32. The receiving mode may simply depend on the position of the receiver with respect to the transmitter coil 33 at any given time.

Figure 4A:
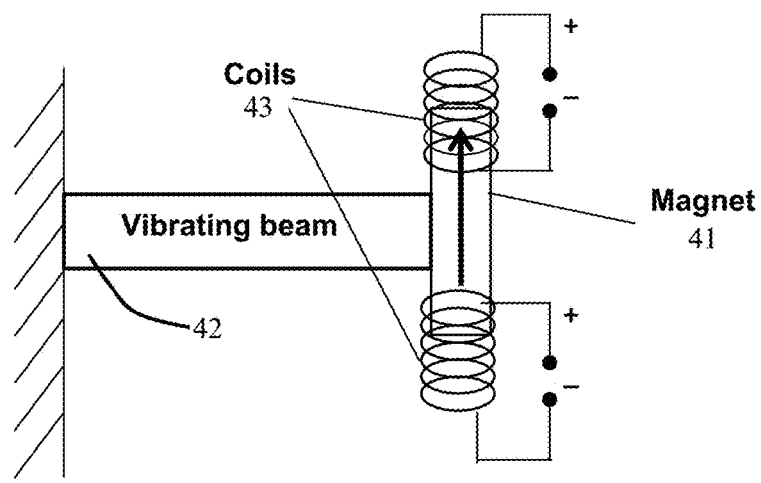
FIGS. 4A-4D show schematic representations of WPT system receivers in accordance with certain embodiments of the invention where the electromechanical conversion is electrodynamic (FIG. 4A), piezoelectric (FIG. 4B), electrostatic (FIG. 4C), and a combination of piezoelectric and electrodynamic (FIG. 4D).
Figure 4B:
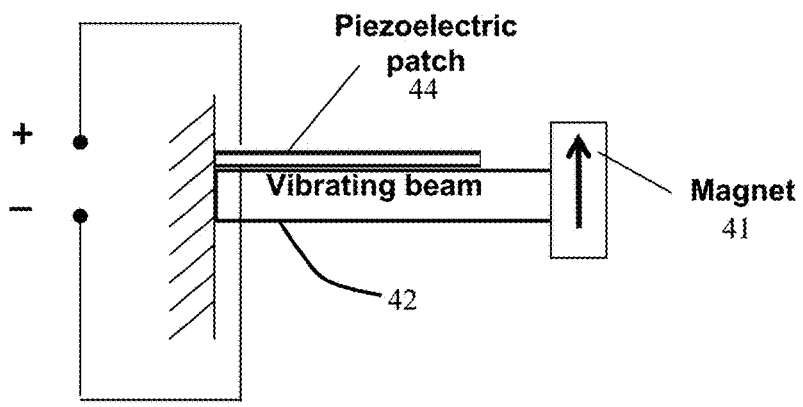
Figure 4C:
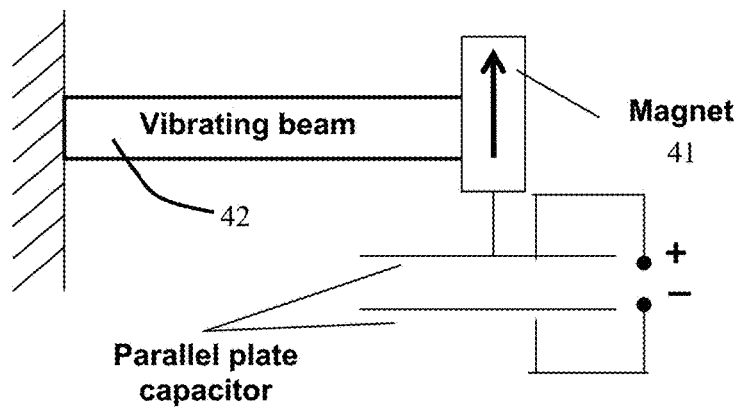
Figure 4D:
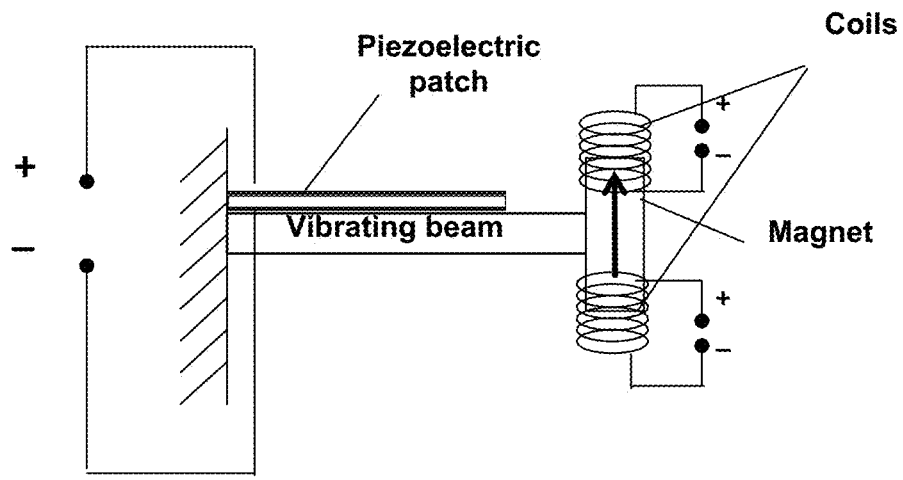

FIGS. 4A-4D show schematic representations of WPT system receivers in accordance with certain embodiments of the invention. According to certain embodiments of the invention, the electromechanical conversion can be electrodynamic (FIG. 4A), piezoelectric (FIG. 4B), electrostatic (FIG. 4C), or a combination of one or more conversion methods. For example, FIG. 4D illustrates a combination of piezoelectric and electrodynamic.

FIG. 4A shows a schematic representation of a receiver portion of a WPT system according to an embodiment of the invention utilizing electrodynamic conversion, where the magnet 41 vibrating along with the vibrating structure 42 to which the magnet is affixed as a result of the electromagnetic fields generated by a transmitter of the WPT system induces current on coils 43 located in the receiver. One or more coils can be used. In the embodiment shown in FIG. 4A two coils 43 are included.

FIG. 4B shows a schematic representation of a WPT system receiver according to an embodiment of the invention utilizing a piezoelectric transducer for the electromechanical conversion in the receiver. In one embodiment, the WPT system utilizing a transmitter and receiver includes a permanent magnet positioned to oscillate at an end of a vibrating structure formed of piezoelectric material. For example, the vibrating structure can have a piezoelectric layer 44, such as a piezoelectric patch, on a vibrating beam 42 to which the magnet 41 is attached. In a specific embodiment, the magnet 41 is at a tip of the beam 42. For certain embodiments of the piezoelectric-based electromechanical conversion system, the magnet 41 with vibrating beam 42 having a piezoelectric layer 44 (or other piezoelectric vibrating structure) can be configured in the same package, forming a piezoelectric transducer. As with the previously described systems, the transmitting coil (not shown) of the transmitter is outside the package. The transmitting coil carries an alternating current and can be connected to a power source. The field generated by the transmitting coil activates the motion of the magnet 41 through magnetic force. Power is generated in the piezoelectric layer 44 (or other piezoelectric vibrating structure) in a manner similar to a piezoelectric vibrational energy harvester, except the system excitation is provided by the magnetic force or torque of the magnet 31 rather than an external vibration.

FIG. 4C shows a schematic representation of a WPT system receiver according to an embodiment of the invention utilizing an electrostatic transducer for the electromechanical conversion in the receiver. For example, a receiver utilizing the electrostatic energy conversion can include a permanent magnet 41 positioned to oscillate at an end of a vibrating structure 42 (for example a beam or spring) and connected to a plate of a parallel plate capacitor 45 (or a variable capacitor connected to a control circuit). Here, power is generated by the parallel plate capacitor 45 in a manner similar to an electrostatic vibrational energy harvester, except the system excitation is provided by the magnetic force or torque of the magnet 41 in the presence of the field generated by a transmitting coil (not shown) rather than an external kinetic vibration.

FIG. 4D shows a schematic representation of a WPT system receiver according to an embodiment of the invention utilizing a hybrid of conversion methods. For the embodiment shown in FIG. 4D, piezoelectric and electrodynamic conversion is utilized in the receiver. Of course, embodiments should not be construed as limited to the particular combination described with respect to FIG. 4D. For example, a hybrid of piezoelectric, electrostatic, and electrodynamic conversion, a hybrid of piezoelectric and electrostatic conversion, or a hybrid of electrostatic and electrodynamic conversion can be utilized in a single receiver. Referring to FIG. 4D, both a piezoelectric layer 44 and coils 43 are used to convert the motion of the magnet 41 oscillating at an end of a vibrating beam 42 to electric energy.

As explained in more detail below, the transmitter portion of the systems can include one or more transmitting coil(s). The field generated by the transmitting coil activates the motion of the magnet through magnetic force. This provides the initial electrodynamic component of the WPT systems. The transmitter portion can be separated from the receiver portion by distances in the centimeter, meter, and kilometer range depending on application. For example, the transmitter portion can be at a fixed location and affect one or more receiver portions within a same room, within a same building, or even within a same city.

In operation, an alternating magnetic field from the transmitting coil(s) excites the magnet in the receiver into mechanical resonance. The frequency of the signal of the alternating or time-varying magnetic field generated by the transmitter can be generated at frequencies of less than 10 kHz. In one embodiment, the frequency of the signal can be selected to be between 120 Hz and 10 kHz. In certain embodiments, the frequency of the transmitted signal can be selected to be one or more of the following: between 10 Hz and 50 Hz, less than 60 Hz, 60 Hz, more than 60 Hz, between 70 Hz and 1 kHz, and one or more multiples of 60 Hz including 120 Hz, 180 Hz, and 240 Hz. Upon excitement by the magnetic field from the transmitting coil(s), the vibrating magnet functions as part of an energy harvester—either to induce a voltage or current in a receiving coil or to simply provide a vibration or energy to a piezoelectric or electrostatic system.

Figure 5:
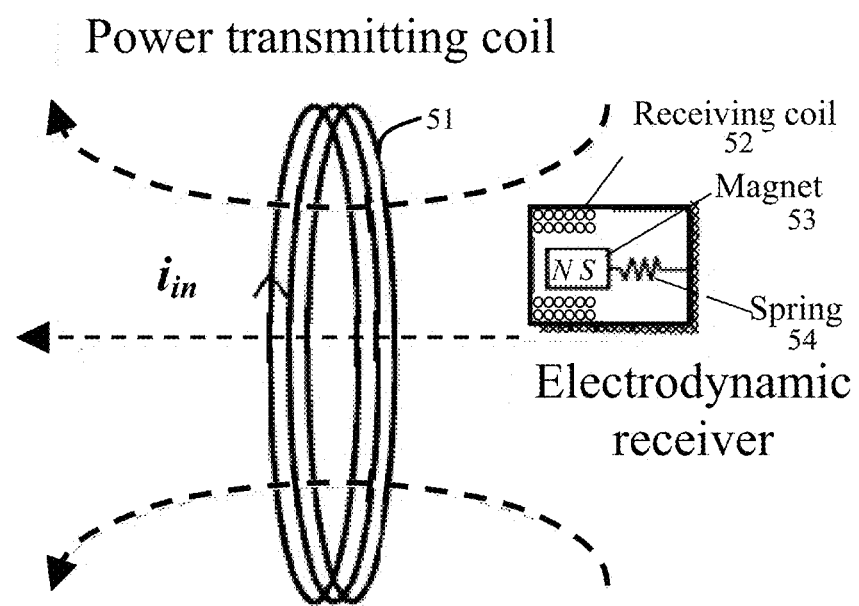
FIG. 5 shows a schematic diagram of an electrodynamically coupled WPT system in accordance with an embodiment of the invention.

FIG. 5 shows a representation of a WPT system in accordance with an embodiment of the invention. Referring to FIG. 5, the WPT system includes a transmitter 21 and an electrodynamic receiver. In accordance with an embodiment of the invention, in the electrodynamic receiver, a magnet 53 is allowed to oscillate in the vicinity of the receiving coil 52, providing a large flux density in the receiving coil 52. The relative positions of the magnet and the receiving coil 52 are made such that a magnet 53 having a length L comes within at least L distance of the receiving coil 52 when moving. The magnet 53 can move such that its north or south pole comes within the vicinity of the receiving coil 52. In certain embodiments, the magnet 53 can oscillate in the axial direction of the receiving coil 52. In one such embodiment, the magnet can be centrally positioned with respect to the receiving coil. In one embodiment, such as shown in FIG. 5, the magnet 53 can oscillate in the axial direction of the receiving coil 52 within at least a first winding of the receiving coil. In another embodiment, the magnet can be positioned at a side of the receiving coil.

The magnet can be one or more permanent magnets. In certain embodiments, the magnet can be connected to a spring 54 (such as shown in FIG. 5) or cantilever in order to allow movement of the magnet 53 with respect to the receiving coil 52.

In a further embodiment, soft magnets can be included at or near the magnet to further affect the magnetic fields. For example, the soft magnets can be arranged to guide or concentrate the magnetic field toward the magnet. The soft magnets can also be used to shape the magnetic field as it approaches the magnet. In an alternate embodiment, the magnet can be or include one or more soft magnets that, when magnetized, induce a voltage in the receiving coil.

According to one embodiment, the receiver portion of the system can include the receiving coil and the magnet in a same package. The combined receiving coil and magnet form an electrodynamic transducer.

The transmitter portion of the system can include one or more transmitting coil(s). The transmitter portion is outside the package of the electrodynamic transducer and connects to a power source to carry an alternating current. The field generated by the transmitting coil activates the motion of the magnet through magnetic force. The transmitter portion can be separated from the receiver portion by distances in the centimeter, meter, and kilometer range depending on application. For example, the transmitter portion can be at a fixed location and affect one or more receiver portions within a same room, within a same building, or even within a same city.

In operation, an alternating magnetic field from the transmitting coil(s) excites the magnet in the receiver into mechanical resonance. The vibrating magnet then functions similar to an energy harvester to induce voltage/current on the receiving coil. Even using fairly weak magnetic fields, significant mechanical oscillations can be induced when the receiver magnet is excited near its mechanical resonance (assuming an underdamped mechanical system). The vibrating magnet presents a large time-varying flux density in the receiving coil, which is much stronger than the field produced by the transmitting coil.

Power is generated on the receiving coil in a manner similar to an electrodynamic vibrational energy harvester, except the system excitation is provided by the magnetic force rather than an external vibration. In particular, according to certain embodiments of the invention, the magnet excitation is provided by an external magnetic field rather than a mechanical vibration.

Unlike inductively coupled WPT systems, where strong electric and magnetic fields permeate the transmitting media, the strong magnetic field in the electrodynamically coupled system (from the magnet) is limited to the region close to the receiving coil. This greatly reduces the exposure of human body to strong magnetic fields.

Due to the high magnetic field experienced by the receiving coil near the magnet, not only can the operating frequency be reduced, but also the receiving coil size. This results in low-frequency operation and a much smaller receiver. In certain embodiments, the receiver can be integrated on a chip or substrate.

Figure 6A:
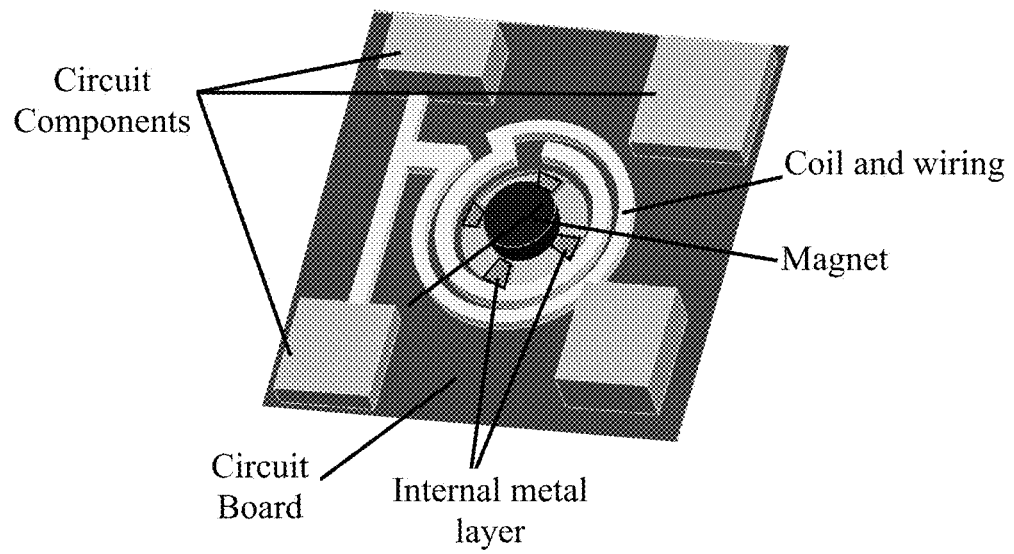
FIGS. 6A and 6B show perspective views of an electrodynamic receiver system according to certain embodiments of the invention.
Figure 6B:
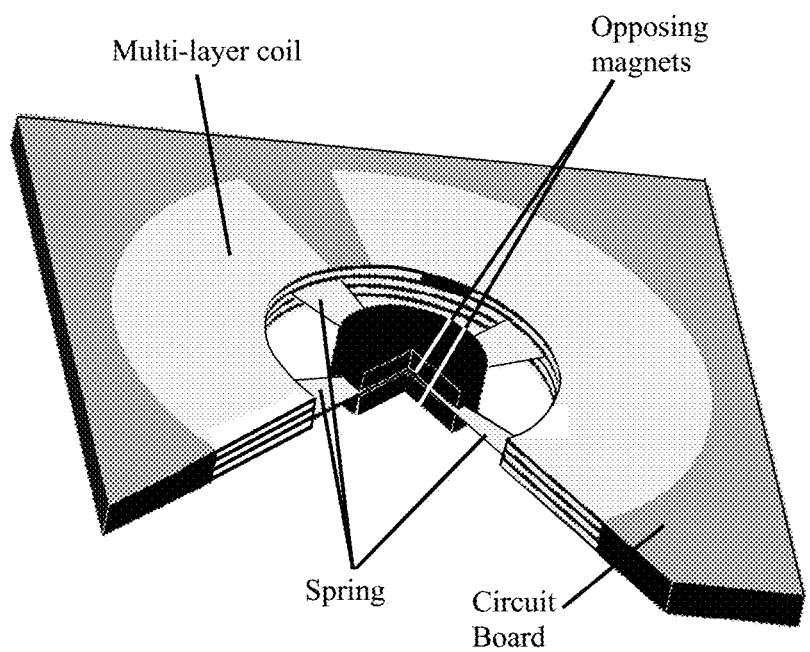

FIGS. 6A and 6B show one implementation of the subject receiver. As shown in FIGS. 6A and 6B, a magnet can be mounted on one or more spring-like suspensions, and the receiving coil can be made with multilevel traces on a printed circuit board. The circuit board can also provide a platform for integration of other circuit components of the system.

In a further embodiment, power electronic circuits for power regulation are included in the system. For example, an ac/dc rectifier and dc/dc regulator are required to convert the receiver coil ac voltage into dc voltage at desired voltage level to supply to the sensor system.

Figure 7:
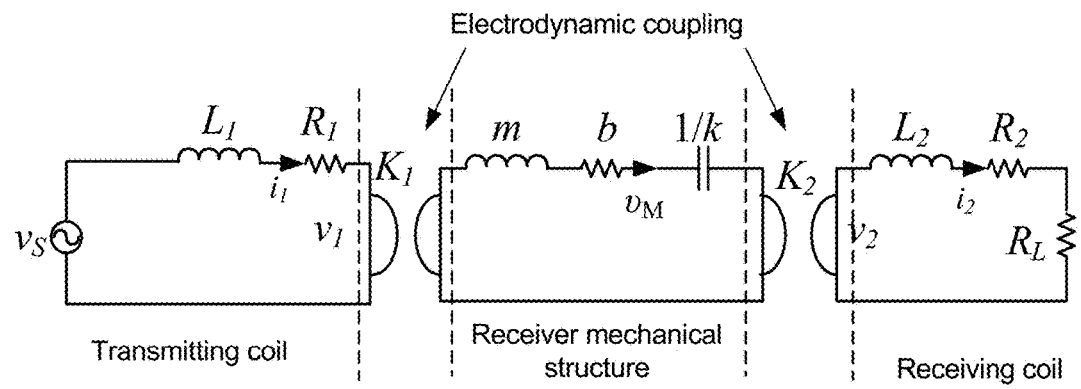
FIG. 7 shows an equivalent circuit model of an electrodynamically coupled WPT system in accordance with an embodiment of the invention.

An equivalent circuit model of the WPT system is shown in FIG. 7. As shown in FIG. 7, the model has three parts: the transmitting coil, the receiver mechanical structure and the receiving coil. The transmitting and receiving coils are both modelled with a series R-L network ($R_1$ & $L_1$ and $R_2$ & $L_2$). $V_S$ and $R_L$ are the source voltage and the load resistance attached to the transmitting coil and receiving coil, respectively. The mechanical structure is modelled using a mass-spring-damper system with mass m (kg), spring constant k (N/m) and viscous damping coefficient b (N·s/m). The electrodynamic coupling between each of the coils and the mechanical structure is modelled with two gyrators with gyration ratios $K_1$ and $K_2$ (V·s/m) representing the transduction coefficients. The transduction coefficient K is shown in Equation (3).

$$K = \oint_{l_{coil}} \vec{B} \cdot d\vec{l}, \quad (3)$$

where $\vec{B}$ is the flux density generated by the magnets and $l_{coil}$ is the length of the coil.

The circuit can be simplified by assuming that the operating frequency under consideration is sufficiently low, so that the inductance of both transmitting and receiving coils can be ignored. With this assumption, the maximum efficiency is obtained at the natural frequency, when the load resistance $R_L$ is given by $$R_L = \sqrt{\frac{(\gamma_1 + \gamma_2 + 1)(\gamma_2 + 1)}{\gamma_1 + 1}} R_2, \quad (4)$$

where $\gamma_i$ is the unitless coupling strength of the electrodynamic coupling and given by $$\gamma_i = \frac{K_i^2}{R_i b}, \quad (5)$$

$i = 1, 2.$

The maximum power efficiency $\eta_{max}$ is given by $$\eta_{max} = \frac{\gamma_1 \gamma_2 \beta}{[\gamma_2 + (\beta+1)(\gamma_1+1)](\gamma_2+\beta+1)}, \quad (6)$$

where $$\beta = \sqrt{\frac{(\gamma_1+\gamma_2+1)(\gamma_2+1)}{\gamma_1+1}}. \quad (7)$$

For a well-designed WPT system, it is reasonable to assume that the electrodynamic receiver is strongly coupled:

$$\gamma_2 \gg 1 \quad (8)$$

Also, since the transmitting coil is much farther away from the magnet than the receiving coil, the transmitting coupling strength $\gamma_1$ is much smaller than the receiving coupling strength $\gamma_2$:

$$\gamma_1 \ll \gamma_2 \quad (9)$$

Substituting Relations (8) and (9) into Equations (4) and (6), the maximum efficiency condition can be simplified to $$R_L = \gamma_2 \sqrt{\frac{1}{\gamma_1+1}} R_2, \quad (10)$$

and the maximum efficiency is given by $$\eta_{max} = \frac{\gamma_1 \sqrt{\frac{1}{\gamma_1+1}}}{\left[1+\sqrt{\gamma_1+1}\right]\left(1+\sqrt{\frac{1}{\gamma_1+1}}\right)}. \quad (11)$$

Figure 8:
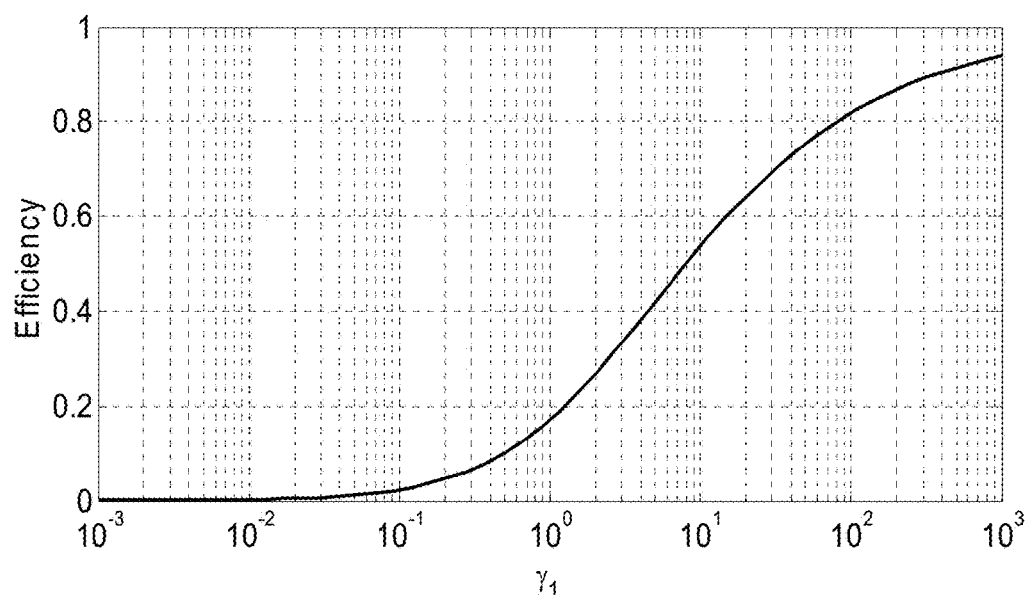
FIG. 8 shows a plot of maximum efficiency vs. transmitting coupling strength, when $\gamma_2 \gg 1$ and $\gamma_1 \ll \gamma_2$, for an embodiment of the invention.

A plot of the maximum efficiency vs. transmitting coupling strength is shown in FIG. 8. This plot is subject to the assumptions given by Relations (8) and (9). Based on the modeling equations and the plot, it can be concluded that high efficiency is related to the transmitting coupling strength.

In accordance with certain embodiments of the invention, the coupling strength can be increased and/or designed by increasing the average radial flux density at the coil conductor; increasing the conductor volume of the coil; using highly conductive material for coil conductor; and/or reducing the mechanical damping coefficient. All of these may be effective means for increasing the overall WPT efficiency. Accordingly, certain embodiments of the invention utilize one or more of these means for increasing the overall WPT efficiency.

According to one embodiment, to increase the coupling strength, the shape and dimensions of the transmitting coil are optimized. Analytic and finite-element magnetostatic field solvers may be used to optimize the magnetic field interactions. In certain embodiments, soft magnets may be used on the receiver and or transmitter to tailor the field patterns. Additionally, structural enhancements and design/optimization tools can be used to improve the electromechanical performance of the receiver. For example, in one embodiment, opposing magnets are used to create a strong radial field to ensure a "strongly coupled" electrodynamic coupling on the receiver side.

In certain embodiments, the transmitter side frequency and power can be adjusted to provide particular distances from which the receiver can successfully receive the signal. Advantageously, frequencies less than RF frequencies used for certain inductively coupled WPT systems can be used.

Figure 9:
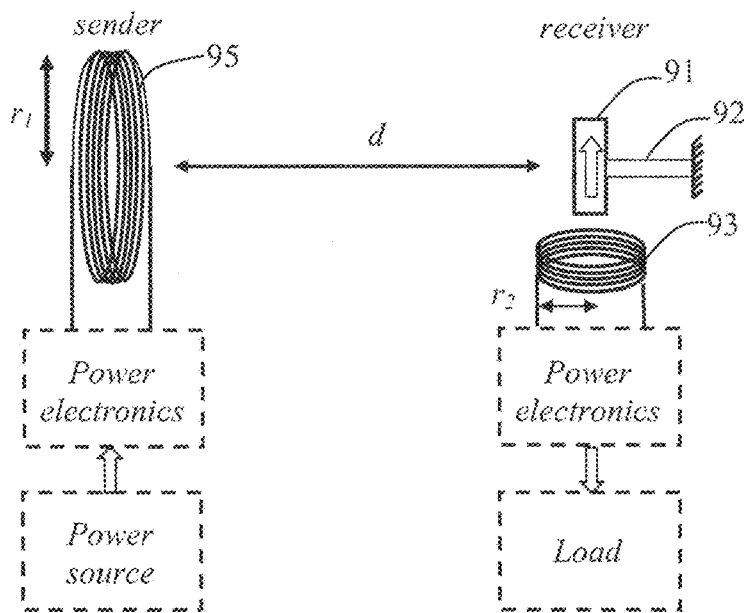
FIG. 9 shows a schematic diagram of an electrodynamically coupled WPT system in accordance with another embodiment of the invention.

FIG. 9 shows another embodiment utilizing an electrodynamic transducer in the receiver, where a permanent magnet 91 is mounted on a vibrating structure, which is illustrated here in the form of a cantilever beam 92. In the specific embodiment shown in FIG. 9, the permanent magnet 91 is mounted on the tip of the cantilever beam 92 where both the permanent magnet 91 and the cantilever beam 92 reside in the receiver 90. Depending on how the magnet 91 is positioned (magnetization direction) on the vibrating structure (shown in this embodiment as cantilever beam 92), instead of the translational force from a magnet positioned as described with respect to FIG. 5, the magnetic field generated by the transmitting coil 95 induces a torque on the free end of the beam 92.

The resulting motion is converted into electrical power via electrodynamic generation on the receiver coil 93 (conventional energy harvester behavior). For peak power outputs, the frequency of the alternating current in the transmitter coil 95 is matched with natural frequency of the receiver device to induce mechanical resonance.

Figure 10:
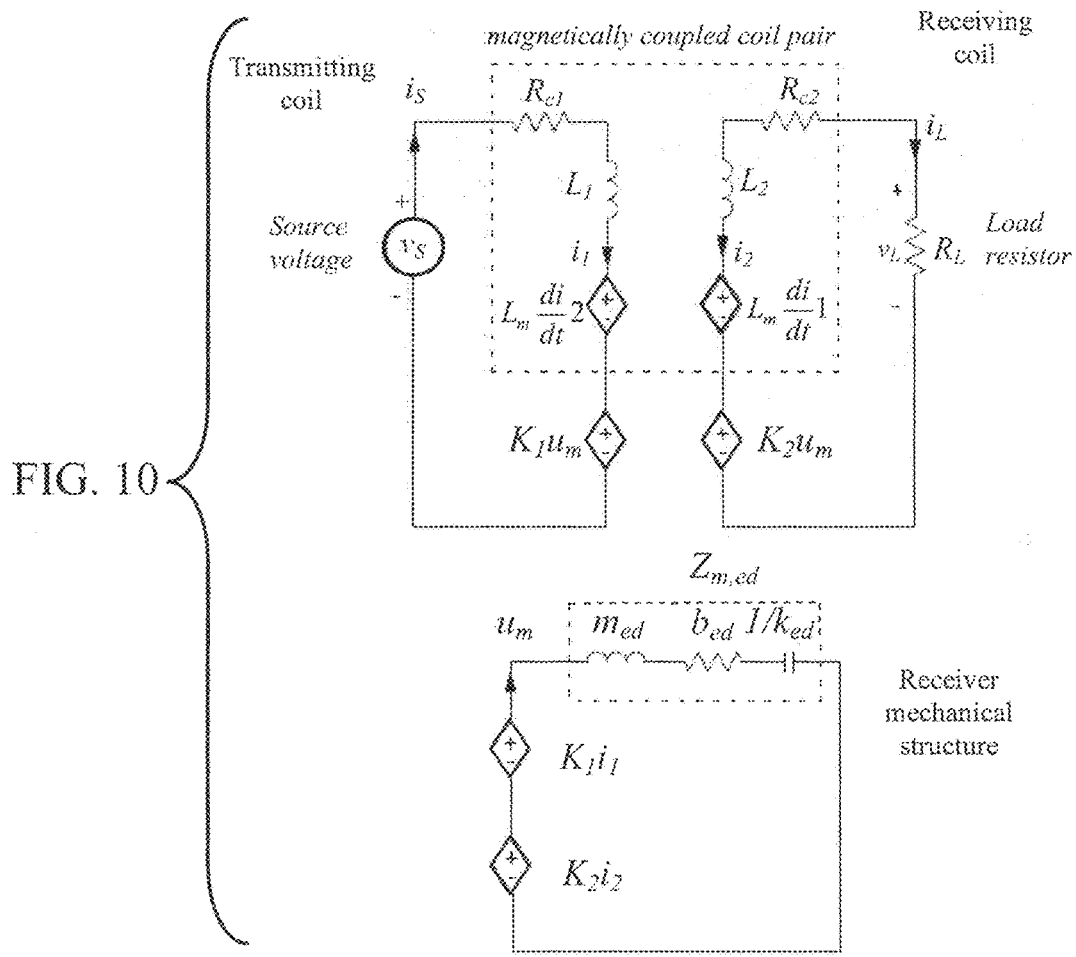
FIG. 10 shows an equivalent reduced-order lumped-model of the WPT system of FIG. 7 in accordance with an embodiment of the invention.

This WPT system can be represented by the simplified lumped model shown in FIG. 10. In operation, an ac voltage is supplied to the transmitter coil, and the corresponding voltage and power delivered to the receiver is measured across a resistive load. This is similar to the descriptions with respect to the equivalent circuit model shown in FIG. 7 and, therefore, is not repeated here.

Several advantages of certain embodiments of the subject electrodynamically coupled systems as compared to conventional inductively coupled systems include, but are not limited to one or more of the following.

Safety: Inductive WPT systems tend to rely on high-frequency time-varying magnetic fields that pose safety limits. In contrast, according to certain embodiments of the invention, power generation in the receiving coil is made possible through the time-varying field generated by a moving magnet positioned close to a receiving coil, the voltage induced in a piezoelectric material by the moving magnet, or the electrostatic potential caused by the moving magnet. While strong magnetic fields can exist inside the receiver, these fields are much weaker outside the receiver package. A time-varying magnetic field from the transmitting coil is used to oscillate the magnet, but by leveraging mechanical resonance, this field can be weaker and have much lower frequency in comparison to the inductively coupled approach.

Efficiency: Inductive WPT demands large, closely spaced, and/or high-quality-factor coils to achieve high efficiency. The efficiency of certain embodiments of the subject system is limited by other technological factors such as the strength of the magnet and the mechanical damping coefficient of the receiver. This provides additional opportunities and design variables that may be manipulated to achieve high efficiency.

Robustness: The power transfer and efficiency of inductive WPT systems rely on precise matching of three frequencies: source frequency, resonant frequency of the transmitter and the receiver. According to an embodiment, in the subject system, the efficiency is maximized when the source frequency matches only the mechanical natural frequency of the receiver. No resonance matching is required between the transmitting and receiving coils. Although the mechanical natural frequency may change slightly over time or with environmental effects, it is reasonably easy to control the source frequency so that it tracks the maximum efficiency point.

Applicability: Application of inductive WPT systems is constrained by power loss and heat generation that may occur in conductive materials in the power transmission path. In contrast, since embodiments of the subject system do not rely on strong, high-frequency magnetic fields in the transmission media, the eddy current generation on conductive objects is much smaller and, in certain cases, negligible.

Arrays: In inductive WPT systems, interference and cross-talk (interference due to possible dynamic coupling between the coils) presents substantial challenges for simultaneously powering multiple receivers. In certain embodiments of the subject system, the receivers in a sensor array can be tuned to resonate at different frequencies, and the transmitter coil can broadcast power in multiple frequency bands. Not only can power be delivered to multiple receivers, the system could intelligently and selectively deliver power to specific receivers. This cannot be implemented in the inductive WPT systems with high efficiency because the resonant frequency of the transmitter must match all the receivers.

Embodiments of the invention utilize magnetic coupling and electromechanical resonance for safe, spatially distributed, low-frequency power delivery to sensors, consumer electronics, or implantable medical devices.

Certain embodiments of the invention can be used for industrial applications such as remote sensors and portable equipment, personal applications such as portable electronics and automobiles, and medical applications such as implanted medical devices and prostheses.

The following examples are illustrative of some of the methods, applications, embodiments and variants of the present invention. They are, of course, not to be considered in any way limitative of the invention. Numerous changes and modifications can be made with respect to the invention.

Example: First Experimental Setup

Figure 11A:
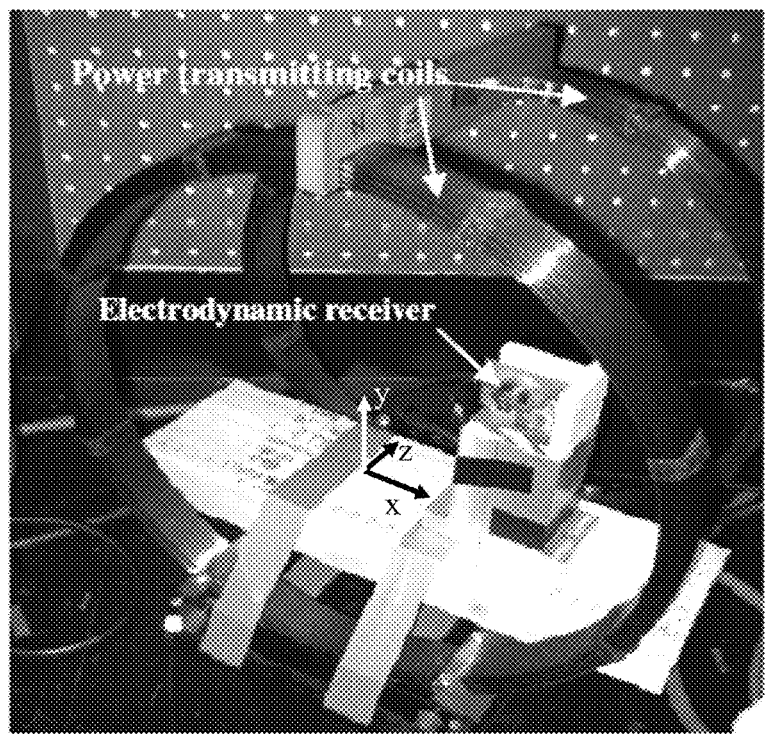
FIGS. 11A and 11B show photographs of an experimental setup illustrating the electrodynamically coupled WPT system.
Figure 11B:
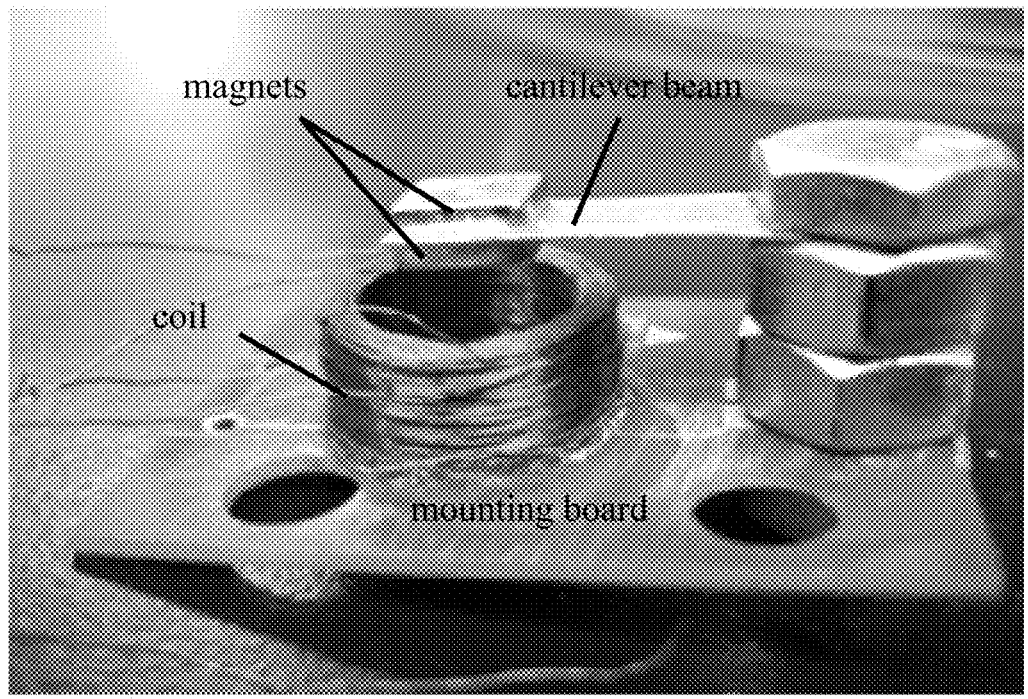

An experiment was performed to illustrate an electrodynamic approach to wireless power transfer. In the experiment, a Helmholtz coil-set was used as the transmitting coil, and an electrodynamic energy harvester was used as the receiver. This experimental setup is shown in FIG. 11A. The Helmholtz coil-set consists of two 295 mm diameter, 124-turn circular coils (AWG 15) with 150 mm spacing. These coils are labeled as "power transmitting coils." The resistance and inductance of each coil are 1.2Ω and 800 μH, respectively. The electrodynamic receiver, also shown in FIG. 11B, consists of two attracting block magnets (NdFeB N50, 6.4×6.4×1.6 mm$^3$) clamped on a cantilever beam (17×7.5×0.2 mm$^3$) at one end. The other end of the cantilever beam is clamped by a bolt and a nut (aluminum) fixed to the mounting board (FR4 PCB). A circular coil (AWG 36, outer diameter×inner diameter×height: 15 mm×11 mm×7.2 mm) is glued to the mounting board underneath the magnets. The receiver is positioned near the transmitting coil using an aluminum holder and a wooden block with gratings.

Figure 12:
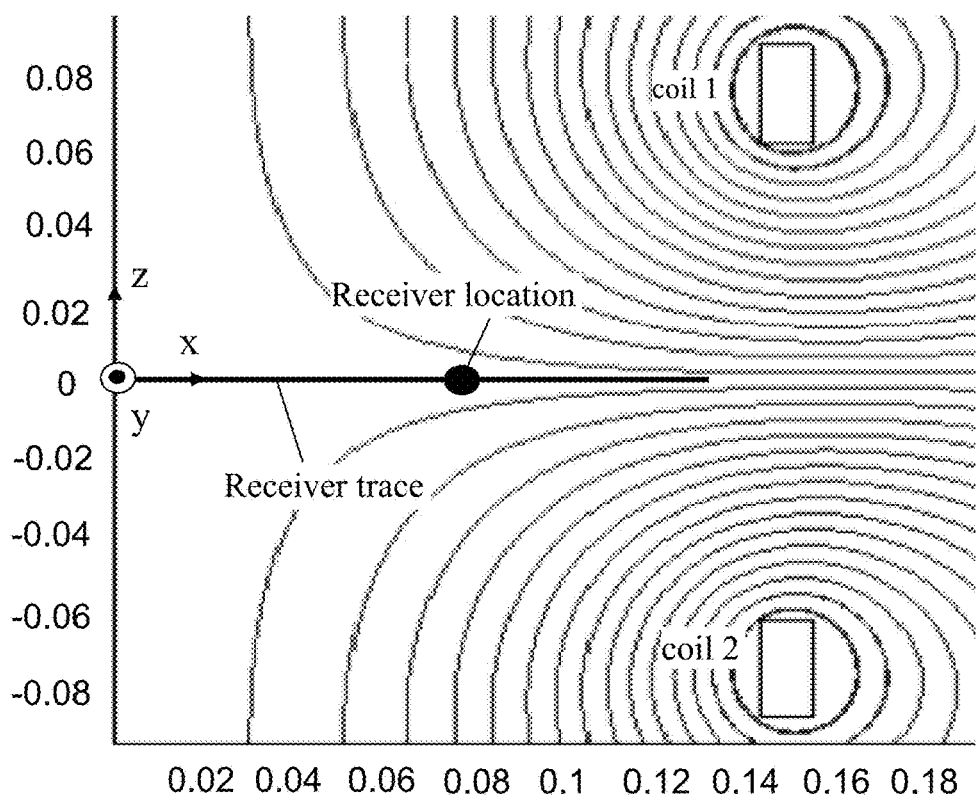
FIG. 12 shows a streamline plot of the flux density generated by the counter-directional coil currents of the experimental setup using 2D axi-symmetric FEM simulation on COMSOL Multiphysics.

The transmitting coils are supplied with counter directional ac current generated by a signal analyzer (Stanford Research Systems, SR785) and amplified by a power amplifier (Techron 7540), creating a time varying gradient field, which is illustrated by the plot shown in FIG. 12. The counter directional currents are used to create a large uniform field gradient. The current amplitude is measured with a current probe (Tetronix TCP312) and regulated by the signal analyzer. The induced voltage on the receiving coil is measured with the signal analyzer.

Figure 13:
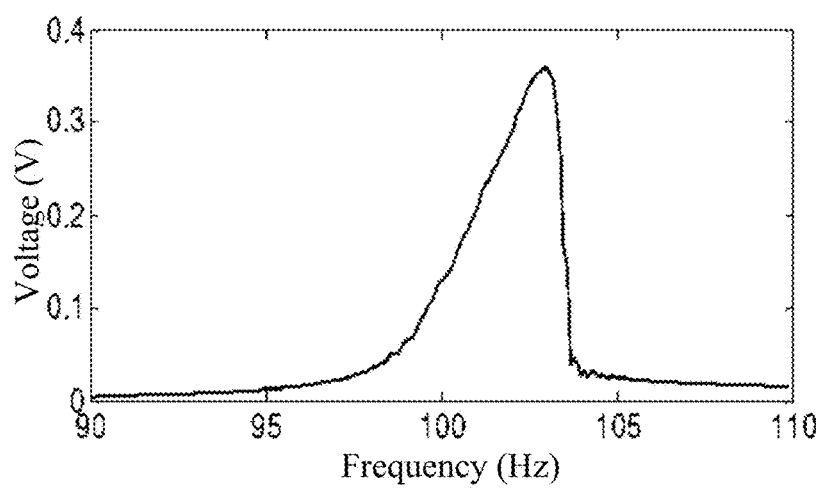
FIG. 13 shows a plot of open-circuit voltage amplitude vs. frequency at 1 A excitation for the experimental setup.

Initially the receiver is positioned midway between the two coils, but radially offset 80 mm as shown in FIG. 11A. In the plot of FIG. 12, the position of the receiver is indicated by the dot. The excitation frequency is swept around the natural frequency of the receiver for a fixed current amplitude of 1 A. The open-circuit voltage frequency response is plotted in FIG. 13. As shown in the plot of FIG. 13, a peak voltage of ~0.35 V is generated at ~103 Hz, which is the natural frequency of the receiver. Based on the output impedance of the receiver at this frequency (~15Ω, almost purely resistive), the maximum power delivery to a resistive load is estimated to be ~1 mW, which is sufficient to power sensors or other low-power electronics. Although the input power on the transmitting coil is measured to be ~500 mW and the efficiency is only ~0.2% for this experimental setup, it should be noted that improved numbers are easily obtainable in various implementations of the invention. In particular, improving coupling strength will improve efficiency. The improvements to coupling strength can be accomplished by increasing the average radial flux density at the coil conductor; increasing the conductor volume of the coil; using highly conductive material for coil conductor; and/or reducing the mechanical damping coefficient. Certain embodiments of the invention utilize one or more of these means for increasing the overall WPT efficiency.

Figure 14:
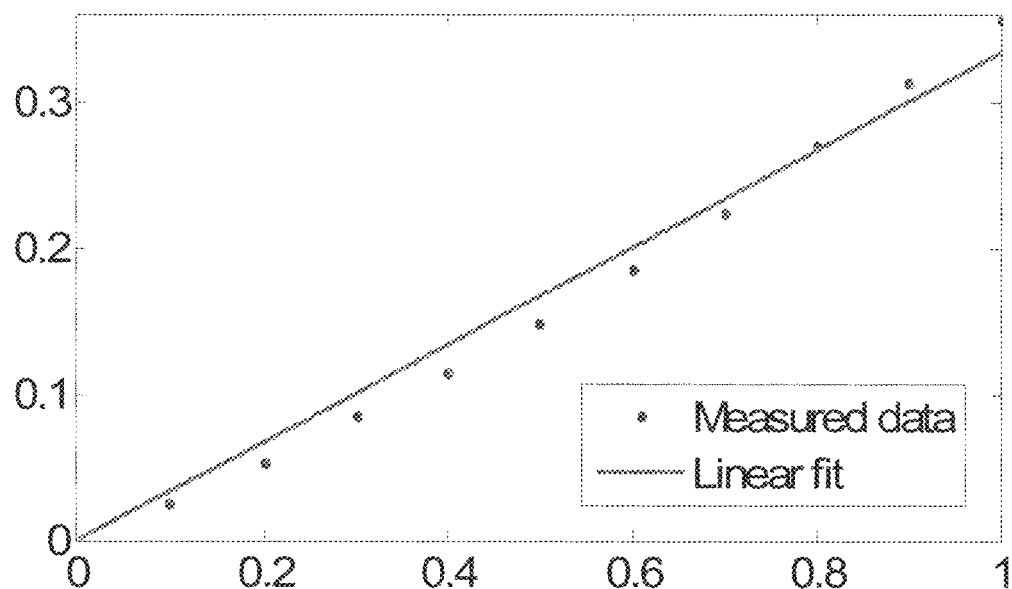
FIG. 14 shows a plot of open-circuit voltage vs. input current amplitude at 103 Hz excitation for the experimental setup.

With the frequency fixed at the natural frequency (103 Hz), the transmitting coil current amplitude is then varied from 0 to 1 A, and the open-circuit voltage is recorded. The results of these measurements are shown in FIG. 14. As shown by the linear fit to the plot in FIG. 14, the relationship between the open-circuit voltage and the input current amplitude is almost linear.

Next, for comparison to an inductively coupled WPT system, the magnets on the receiver were removed, so that the system resembles an inductively coupled WPT system between the transmitting coils and the receiver coil. With 1 A input current, the frequency was swept within the same range as the previous test. The results from the comparison test (not shown) indicated that the induced open-circuit voltage is two orders of magnitude lower than the electrodynamically coupled system. In addition, the estimated power for the inductively coupled WPT system is ~5000× lower. The open-circuit voltage of the inductively coupled system increases to a level similar to the electrodynamically coupled system only when the frequency is increased to greater than 10 kHz.

Figure 15:
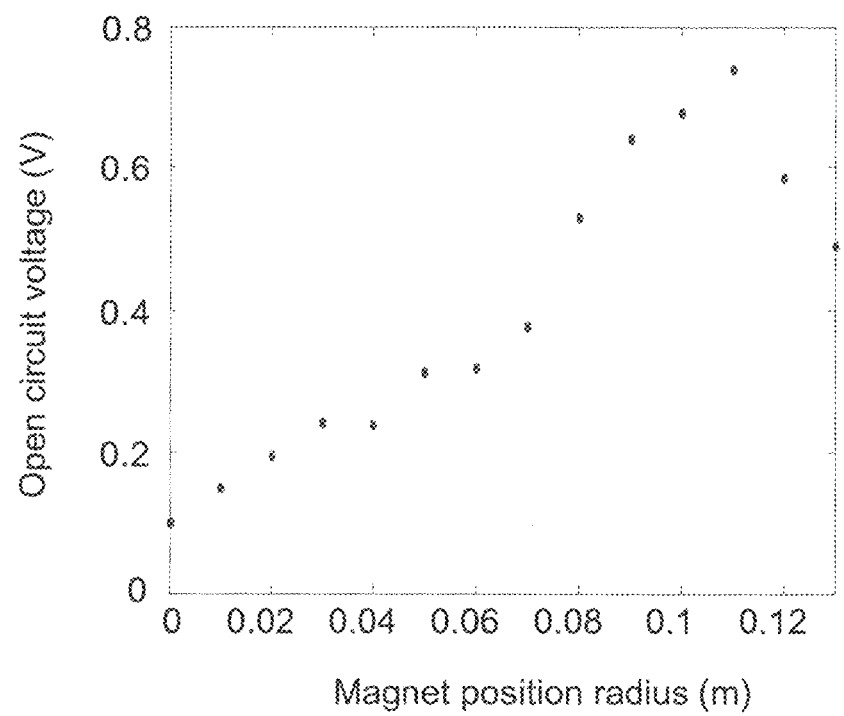
FIG. 15 shows a plot of open-circuit voltage amplitude vs. magnet position for 1 A current at 103 Hz for the experimental setup.

In the last experiment, the position dependency was investigated by moving the receiver radially along the trace shown in FIG. 13. The open-circuit voltage vs. radial position was plotted and is shown in FIG. 15. The data shows the voltage increasing to a maximum of ~0.75 V as the receiver moves to the radial position of 110 mm. At this peak voltage location, ~5 mW of power is estimated, which is a 5× improvement over the prior results.

The experiments show that the electrodynamically coupled WPT approach can be used for low-frequency applications. In addition, significant improvements can be made to increase the power transfer efficiency.

The demonstrated electrodynamically coupled WPT system provides a safe, low-frequency and potentially small-size solution for broad range of WPT applications. The system model reveals that by increasing the transmitting coupling strength, the efficiency can be significantly increased.

Example: Second Experimental Setup

Figures 16A, 16B:
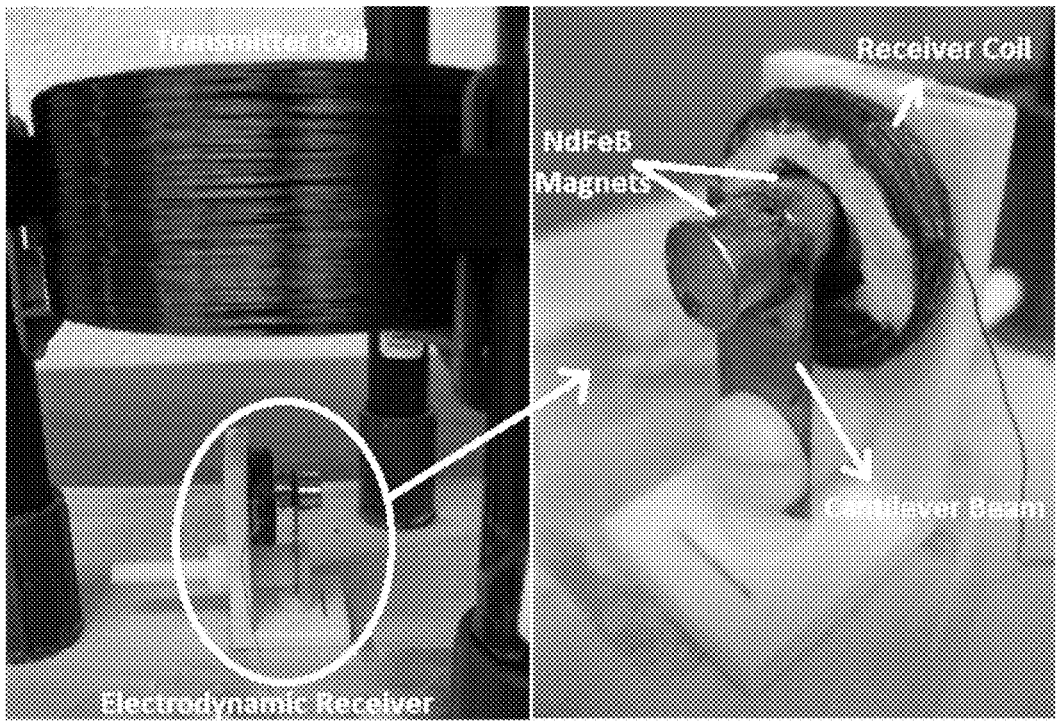
FIGS. 16A and 16B show photographs of a prototype WPT system according to an embodiment of the invention.

An experiment was performed to illustrate another electrodynamic approach to wireless power transfer. The second experimental setup using a transmitter coil and an electrodynamic receiver is shown in FIG. 16A. The electrodynamic receiver, also shown in FIG. 16B, consists of two attracting NdFeB magnets clamped on a cantilever beam at one end. The other end of the cantilever beam is clamped to a mounting board. A circular coil is glued to the mounting board underneath the magnets. The receiver is positioned near the transmitting coil. Instead of the receiver coil being positioned parallel to the transmitting coil and the magnet positioned for translational force as with the first experimental setup, the receiver coil is positioned orthogonal to the transmitting coil and the magnet positioned for applying a torque on the cantilever beam (e.g., rotational torque).

For the second experimental setup, the peak power efficiency improved to 13%. For an input power of 6.3 mW, the system delivers 0.9 mW at 1 cm and 15 μW at 10 cm from the transmitting coil. In addition, the initial models/prototypes have depicted a possible power output in the range of microwatts to milliwatts depending on the distance between the transmitter and the receiver.

Figure 17:
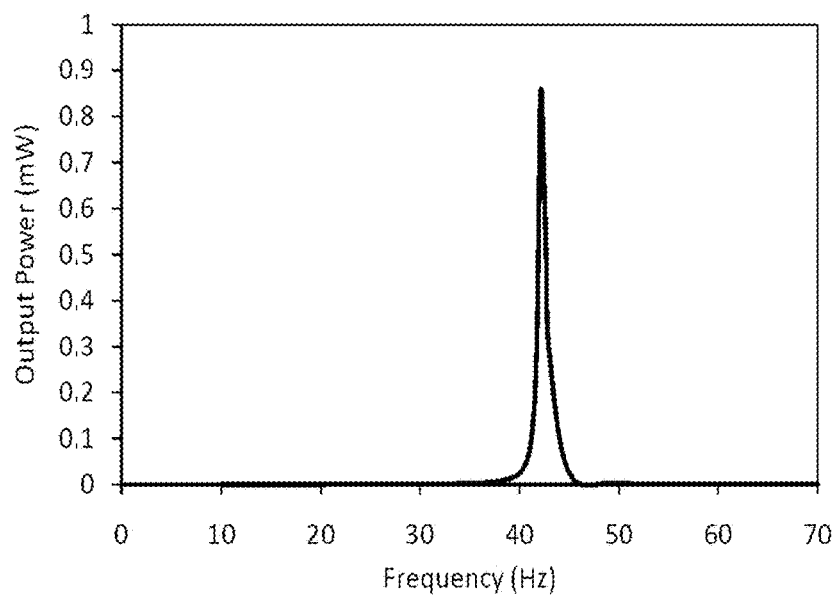
FIG. 17 shows a plot of power transmission vs. frequency.
Figure 18:
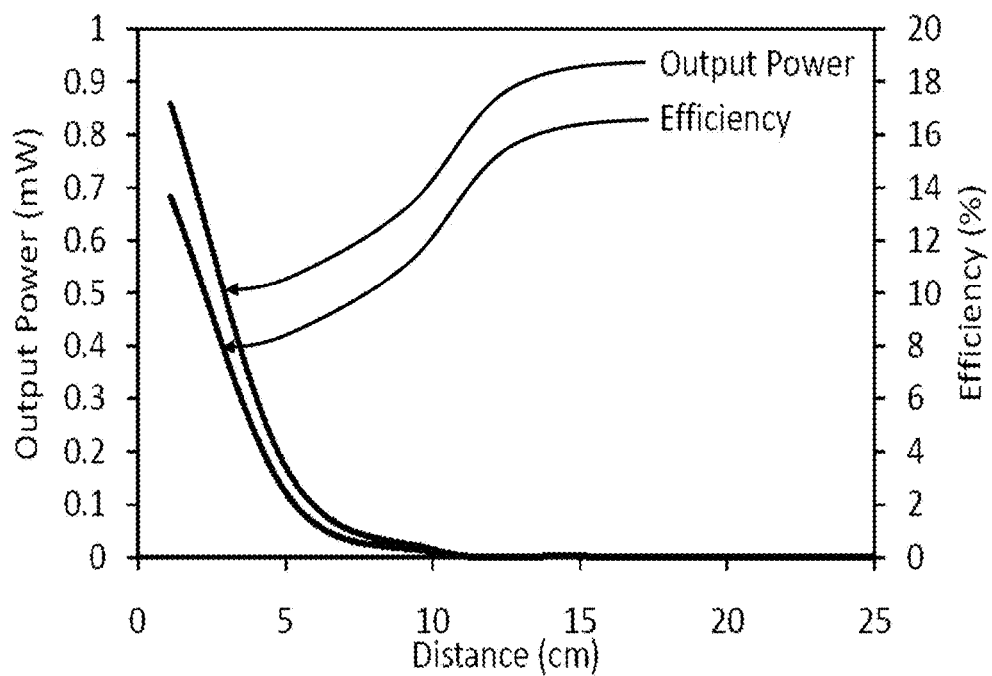
FIG. 18 shows a plot of system efficiency and power transmission vs. distance (axial distance between transmit coil and receiver).
Figure 19:
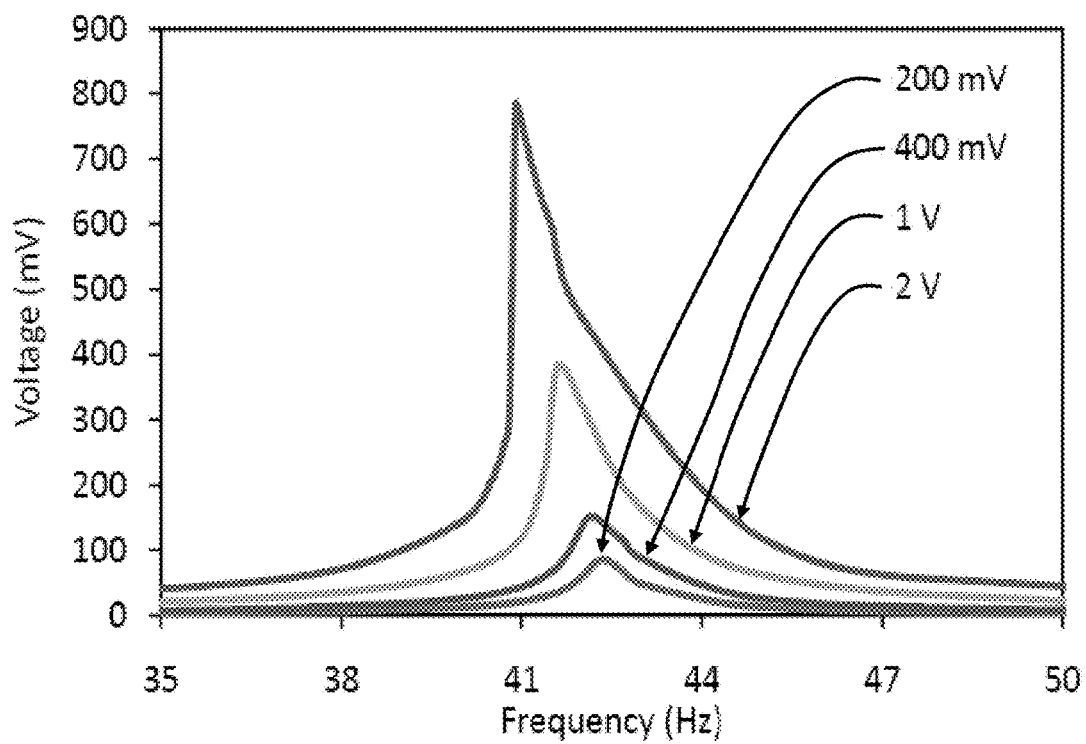
FIG. 19 shows a plot of output voltage vs. frequency with increasing input power (200 mV, 400 mV, 1 V, and 2 V input voltage).

The maximum voltage and power is induced on the receiver at the mechanical resonance of the system, which is shown as ~45 Hz in FIG. 17. Referring to the plot of FIG. 18, as the distance between the transmitter and the receiver increases, the efficiency and power delivery decreases. With increased input voltage amplitude, the system exhibits non-linear response as shown in FIG. 19.

Although the efficiency of this approach contains limitations, power transmission is possible through conductive media such as a metal wall, the human body, and even underwater applications. In addition, other energy-harvester techniques, such as the piezoelectric and electrostatic approaches described with respect to FIGS. 10A, 10C, and 10D, can be used on the receiver while still using the low-frequency magnetic fields for system excitation.

The demonstrated electrodynamically coupled WPT system provides a safe, low-frequency and potentially small-size solution for broad range of WPT applications.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A wireless power transfer system, comprising:
   a transmitter generating a time-varying external magnetic field; and
   a receiver generating electrical power under an influence of the external magnetic field by electromechanical conversion, wherein the receiver comprises:
   a magnet that oscillates via electrodynamic coupling under the influence of the external magnetic field, and
   an electromechanical conversion element coupled to the magnet, wherein the electromechanical conversion element comprises a variable capacitor comprising plates, wherein the magnet is connected to a plate of the variable capacitor and the oscillating movement of the magnet causes a time-varying capacitance change in the variable capacitor thereby generating the electrical power.

2. The wireless power transfer system according to claim 1, wherein the oscillating movement of the magnet causes a corresponding time-varying change in a gap of the variable capacitor.

3. The wireless power transfer system according to claim 1, wherein the electromechanical conversion element further comprises:
   a mechanical flexure on which a piezoelectric material and the magnet are disposed, wherein movement of the magnet causes mechanical stress upon the piezoelectric material; or
   a receiving coil, wherein movement of the magnet induces a voltage in the receiving coil.

4. The wireless power transfer system according to claim 3, wherein the receiver is configured such that a pole direction of the magnet with respect to the external magnetic field remains substantially the same when the magnet moves.

5. The wireless power transfer system according to claim 1, wherein the receiver is configured such that a pole direction of the magnet with respect to the external magnetic field remains substantially the same when the magnet moves.

6. The wireless power transfer system according to claim 1, wherein the magnet comprises a permanent magnet.

7. A method of wireless power transfer, comprising:
   generating and transmitting a time-varying magnetic field at a first frequency using a first transmitter; and
   generating a time-varying voltage in a receiver by allowing a magnet of the receiver to move due to an influence of a magnetic force generated by the magnetic field from the transmitter, the movement of the magnet influencing an electromechanical conversion element in the receiver,
   wherein the electromechanical conversion element comprises a variable capacitor, wherein the magnet is connected to a plate of the variable capacitor and movement of the magnet causes a time-varying capacitance change in the variable capacitor that generates the time-varying voltage.

8. The method according to claim 7, wherein the electromechanical conversion element comprises a plurality of mechanical flexures on which the magnet is disposed.

9. The method according to claim 7, wherein the electromechanical conversion element further comprises:
   a mechanical flexure on which a piezoelectric material and the magnet are disposed; or
   a receiving coil, wherein movement of the magnet induces a voltage in the receiving coil.

10. The method according to claim 9, wherein a pole direction of the magnet with respect to the magnetic field remains substantially the same when the magnet moves.

11. The method according to claim 7, wherein a pole direction of the magnet with respect to the magnetic field remains substantially the same when the magnet moves.

12. The method according to claim 7, wherein the first frequency is between 120 Hz and 10 kHz.

13. The method according to claim 7, further comprising:
generating and transmitting a second time-varying magnetic field at a second frequency different than the first frequency using the first transmitter; and
generating a second voltage in a second receiver by allowing a second magnet of the second receiver to move due to an influence of a magnetic force generated by the second magnetic field from the transmitter, the movement of the second magnet influencing a second electromechanical conversion element in the second receiver,
wherein the second electromechanical conversion element comprises at least one of the following:
a second piezoelectric material, wherein movement of the second magnet causes mechanical stress upon the second piezoelectric material; and
a second variable capacitor, wherein movement of the second magnet causes a capacitance change in the variable capacitor.

14. The method according to claim 13, wherein the second electromechanical conversion element comprises at least two of the following:
a second mechanical flexure on which the second piezoelectric material and the second magnet are disposed;
the second variable capacitor, wherein the second magnet is connected to the second variable capacitor; and
a second receiving coil, wherein movement of the second magnet induces a voltage in the second receiving coil, and
wherein a pole direction of the second magnet with respect to the second magnetic field remains substantially the same when the second magnet moves.

15. A receiver of a wireless power transfer system, the receiver generating power under an influence of a time-varying external magnetic field by electromechanical conversion, wherein the receiver comprises:
a magnet attached to an end of a mechanical flexure, the magnet oscillating via electrodynamic coupling under the influence of the time-varying external magnetic field, and
an electromechanical conversion element coupled to the magnet, wherein the electromechanical conversion element comprises a variable capacitor, wherein the magnet is connected to a plate of the variable capacitor and the oscillating movement of the magnet causes a time-varying capacitance change in the variable capacitor thereby generating the power.

16. The receiver according to claim 15, wherein the electromechanical conversion element further comprises:
a piezoelectric material disposed on the mechanical flexure, wherein movement of the magnet causes mechanical stress upon the piezoelectric material; or
a receiving coil, wherein movement of the magnet induces a voltage in the receiving coil.

17. The receiver according to claim 16, wherein the receiver is configured such that a pole direction of the magnet with respect to the external magnetic field remains substantially the same when the magnet moves.

* * * * *